(12) United States Patent
Naumann et al.

(10) Patent No.: US 8,310,177 B2
(45) Date of Patent: Nov. 13, 2012

(54) BATTERY MANAGEMENT SYSTEM FOR A CORDLESS TOOL

(75) Inventors: William L. Naumann, Chardon, OH (US); Duane R. Bookshar, Highland Heights, OH (US); Leonard V. Demchak, Streetsboro, OH (US)

(73) Assignee: Stanley Black & Decker, Inc., New Britain, CT (US)

(*) Notice: Subject to any disclaimer, the term of this patent is extended or adjusted under 35 U.S.C. 154(b) by 575 days.

(21) Appl. No.: 12/423,545

(22) Filed: Apr. 14, 2009

(65) Prior Publication Data

US 2009/0256502 A1    Oct. 15, 2009

Related U.S. Application Data

(60) Provisional application No. 61/071,124, filed on Apr. 14, 2008.

(51) Int. Cl.
*H02P 27/00* (2006.01)

(52) U.S. Cl. ........ 318/139; 318/105; 318/111; 318/112; 318/479; 318/504

(58) Field of Classification Search .................. 318/139, 318/105, 111, 112, 479, 504, 245, 248; 388/937
See application file for complete search history.

(56) References Cited

U.S. PATENT DOCUMENTS

| | | | |
|---|---|---|---|
| 4,267,914 A | 5/1981 | Saar | |
| 4,285,112 A | 8/1981 | Eshghy | |
| 4,292,571 A * | 9/1981 | Cuneo | 318/17 |
| 4,315,162 A | 2/1982 | Ferguson | |
| 4,581,570 A | 4/1986 | Mejia | |
| 4,834,192 A | 5/1989 | Hansson | |
| 5,121,046 A * | 6/1992 | McCullough | 320/117 |
| 5,298,821 A | 3/1994 | Michel | |
| 5,506,456 A | 4/1996 | Yang | |
| 5,573,074 A | 11/1996 | Thames et al. | |
| 5,687,129 A * | 11/1997 | Kim | 365/229 |
| 5,734,025 A | 3/1998 | Komai et al. | |

(Continued)

FOREIGN PATENT DOCUMENTS

DE        24 12 143 A1    9/1975

(Continued)

OTHER PUBLICATIONS

Extended Search Report as issued for European Application No. 09157550.6, dated Oct. 18, 2010.

*Primary Examiner* — Bentsu Ro
*Assistant Examiner* — Bryan Gordon
(74) *Attorney, Agent, or Firm* — Pillsbury Winthrop Shaw Pittman LLP

(57) ABSTRACT

A hand-held, battery powered tool (e.g., nutrunner, drill) includes an output head operatively connected to a motor, a plurality of battery cells, an ON/OFF start switch, a resistance sensor that measures a resistance of the output head to movement, and a controller. When the start switch is ON and the resistance sensed by the resistance sensor does not exceed a predetermined shift resistance, the controller automatically connects the plurality of battery cells to each other and the motor in series. When the start switch is ON and the resistance sensed by the resistance sensor exceeds the predetermined shift resistance, the controller automatically connects the plurality of battery cells to each other in parallel and to the motor.

20 Claims, 3 Drawing Sheets

U.S. PATENT DOCUMENTS

| | | | | |
|---|---|---|---|---|
| 5,897,454 | A | 4/1999 | Cannaliato | |
| 6,104,162 | A * | 8/2000 | Sainsbury et al. | 320/111 |
| 6,430,692 | B1 | 8/2002 | Kimble et al. | |
| 6,431,289 | B1 | 8/2002 | Potter et al. | |
| 6,581,696 | B2 * | 6/2003 | Giardino | 173/1 |
| 6,727,679 | B2 | 4/2004 | Kovarik et al. | |
| 6,731,022 | B2 | 5/2004 | Silverman | |
| 6,761,229 | B2 | 7/2004 | Cripe et al. | |
| 6,860,341 | B2 | 3/2005 | Spielmann et al. | |
| 6,978,846 | B2 | 12/2005 | Kawai et al. | |
| 6,983,810 | B2 | 1/2006 | Hara et al. | |
| 7,090,030 | B2 | 8/2006 | Miller | |
| 7,121,361 | B2 | 10/2006 | Hara et al. | |
| 7,157,882 | B2 | 1/2007 | Johnson et al. | |
| 7,176,656 | B2 | 2/2007 | Feldmann | |
| 7,210,541 | B2 | 5/2007 | Miller | |
| 2005/0110458 | A1 * | 5/2005 | Seman et al. | 320/114 |
| 2005/0247459 | A1 | 11/2005 | Voigt et al. | |
| 2005/0263305 | A1 | 12/2005 | Shimizu et al. | |
| 2005/0280393 | A1 * | 12/2005 | Feldmann | 320/114 |
| 2006/0157262 | A1 * | 7/2006 | Chen | 173/176 |
| 2006/0218768 | A1 | 10/2006 | Makimae et al. | |
| 2006/0222930 | A1 | 10/2006 | Aradachi et al. | |
| 2006/0225904 | A1 | 10/2006 | Chen | |
| 2008/0079319 | A1 * | 4/2008 | Okada et al. | 310/12 |

FOREIGN PATENT DOCUMENTS

| | | |
|---|---|---|
| EP | 1266725 | 12/2002 |
| GB | 2 399 148 A | 9/2004 |
| JP | 2000308268 | 11/2000 |

* cited by examiner

BATTERY MANAGEMENT SYSTEM FOR A CORDLESS TOOL

CROSS REFERENCE

This application claims the benefit of priority from U.S. Provisional Patent Application No. 61/071,124, filed Apr. 14, 2008, titled "BATTERY MANAGEMENT SYSTEM FOR A CORDLESS TOOL," the entire contents of which are hereby incorporated by reference herein.

BACKGROUND OF THE INVENTION

1. Field of the Invention

The present invention relates generally to battery-powered, power tools, and more specifically to torque and speed management systems for such tools.

2. Description of Related Art

Power tools (e.g., nutrunners) such as those used for securing threaded fasteners (e.g., nuts, bolts, screws, etc.) are typically selected by their ability to tighten the threaded fastener to a specified torque level. Such tools typically have a high-speed, low-torque motor coupled to a speed reduction transmission in order to increase the output torque to the desired tightening torque level. The output of this speed reduction transmission may in turn couple to an output head so configured to suit the intended use; e.g. an angle or offset output head may be used to allow access to specific threaded fasteners. Various interchangeable bits or sockets may connect to the output head in order to drive threaded fasteners, e.g., bits or sockets appropriate for driving hex-head bolts and hexagonal nuts. Various methods of limiting or controlling the tightening torque may be employed to suit the intended use. The speed reduction transmission has a gear ratio sufficient to increase the output torque of the motor to a level equal to or greater than the specified tightening torque level for a particular fastener. This gear reduction transmission will also reduce the output spindle speed by the same ratio.

The process of securing a threaded fastener typically consists of two distinct phases: a first, relatively free-running, or low torque resistance phase whereby the fastener is rotated through a number of revolutions to engage the fastener threads with the threads of the mating part, and a second, relatively high torque resistance tightening phase whereby the mechanical advantage of its screw threads are used to clamp together the mating parts and preload the fastener. Depending on the dimensional characteristics and mechanical properties of the mating parts of the assembly, the first phase may include roughly 3 to 10 revolutions (or more or less depending on the particular application), whereas the second phase may consist of less than a single revolution. A power tool suitable for securing threaded fasteners must be capable of performing both phases of the securing process. When selecting a motor for use in a power tool intended for securing threaded fasteners, a manufacturer typically compromises performance in one phase in order to achieve the desired performance in the other phase. That is, a manufacturer may sacrifice speed to increase tightening torque capacity or vice-versa.

Battery-powered tools are limited by the available energy stored in the battery pack and by the electrical characteristics of the motor. Battery-powered tools are typically intended to be portable, thereby limiting the practical size of the motor and the battery pack. Smaller motors and lighter battery packs will typically result in lower motor torque characteristics. Motors with low output torque characteristics will require a high gear ratio to produce the required output torque resulting in a low output spindle speed. For battery-powered tools intended for production use, an excessively low output spindle speed will negatively affect productivity.

Battery-powered tools are also limited by the rate at which the battery pack can deliver its stored energy to the motor. This is a function of the voltage and current capacity of the battery pack. Typically, the battery voltage level will drop as more current is delivered to the motor. Battery cell chemistry affects its ability to deliver current to the motor with each particular cell chemistry having its practical limits.

SUMMARY OF THE INVENTION

An aspect of one or more embodiments of the present invention provides a battery-powered tool that automatically arranges its batteries in a series arrangement during an initial phase of its operation to increase voltage and run the motor quickly during a low-resistance/torque phase of the operation cycle. When the resistance/torque exceeds a predetermined shift resistance/torque, the tool automatically switches the batteries into a parallel arrangement that increases the current to the motor and thereby increases the motor's torque/force during the high-resistance/torque phase of the tool's operation cycle. When used in a threaded fastener tightening cycle (e.g., screw, nut, bolt, etc.), such a tool may quickly spin a threaded fastener during the initial low-torque, free-running phase of the tightening cycle, and then apply a higher torque during the final high-torque phase of the tightening cycle. Such a combination of parallel/series arrangements may reduce the tightening cycle time while still being able to reach a high tightening torque.

Another aspect of one or more embodiments of the present invention provides a battery-powered fastening tool that can tighten threaded fasteners to a relatively high torque level without sacrificing maximum tool speed or fastening cycle time.

Another aspect of one or more embodiments of the present invention improves the productivity of the threaded fastener tightening process.

Another aspect of one or more embodiments of the present invention increases the torque output of a battery-powered tool without requiring additional battery cells.

Another aspect of one or more embodiments of the present invention reduces the size, weight, and/or cost of a battery-powered tool.

Another aspect of one or more embodiments of the present invention provides improved battery life (e.g., an increased number of fastener tightening cycles per charge) for a battery-powered tool by reducing the peak current required from each battery cell.

Another aspect of one or more embodiments of the present invention provides a tool that includes an output head; a motor operatively connected to the output head; a plurality of battery cells; a resistance sensor that measures the output head's resistance to movement; and a controller connected to the motor, the plurality of battery cells, and the resistance sensor. The controller is constructed and arranged to connect the plurality of battery cells to each other and the motor in series, and subsequently automatically connect the plurality of battery cells to each other in parallel and to the motor when the resistance sensed by the resistance sensor exceeds a predetermined shift resistance. The resistance sensor may be any type of resistance sensor (e.g., torque sensor; force sensor).

According to a further aspect of one or more of these embodiments, the output head includes a rotational output head, the resistance sensor includes a torque sensor that measures a torque applied to the output head, and the predetermined shift resistance is a predetermined shift torque. The controller may be constructed and arranged to disconnect the motor from the plurality of battery cells when the sensed torque exceeds a predetermined target torque. The predetermined target torque may be larger than the predetermined shift torque.

According to a further aspect of one or more of these embodiments, the tool includes a fixed or variable ratio transmission disposed between the motor and the output head.

According to a further aspect of one or more of these embodiments, the controller includes an electronic control unit.

According to a further aspect of one or more of these embodiments, the tool further includes a start switch having ON and OFF positions. The start switch is operatively connected to the controller. The controller is constructed and arranged to connect the plurality of battery cells to each other and to the motor in series in response to the start switch moving into its ON position.

According to a further aspect of one or more of these embodiments, the tool further includes a start switch having ON and OFF positions. The start switch is operatively connected to the controller. The controller is constructed and arranged such that when the start switch is in its ON position and the resistance sensed by the resistance sensor exceeds the predetermined shift resistance, the controller automatically connects the plurality of battery cells to each other in parallel and to the motor.

According to a further aspect of one or more of these embodiments, the tool further includes a start switch having ON and OFF positions. The start switch is operatively connected to the controller. The controller is constructed and arranged such that when the start switch is in its ON position and the resistance sensed by the resistance sensor does not exceed the predetermined shift resistance, the controller automatically connects the plurality of battery cells to each other and the motor in series.

According to a further aspect of one or more of these embodiments, the tool further includes a start switch having ON and OFF positions. The start switch is operatively connected to the controller. The controller is constructed and arranged to automatically disconnect the motor from the plurality of battery cells any time that the start switch moves into its OFF position.

Another aspect of one or more embodiments of the present invention provides a tool that includes an output head; a motor operatively connected to the output head; a plurality of battery cells; a start switch having ON and OFF positions; a resistance sensor that measures the output head's resistance to movement; and a controller connected to the motor, the plurality of battery cells, the start switch, and the resistance sensor. The controller is constructed and arranged such that when the start switch is in its ON position and the resistance sensed by the resistance sensor does not exceed a predetermined shift resistance, the controller automatically connects the plurality of battery cells to each other and the motor in series. The controller is constructed and arranged such that when the start switch is in its ON position and the resistance sensed by the resistance sensor exceeds the predetermined shift resistance, the controller automatically connects the plurality of battery cells to each other in parallel and to the motor.

Another aspect of one or more embodiments of the present invention provides a method of using a battery powered tool. The method includes (a) connecting a plurality of battery cells to each other and to a motor in series; and (b) automatically connecting the plurality of battery cells to each other in parallel and to the motor in response to a resistance sensor sensing that a resistance of an output head to movement exceeds a predetermined shift resistance.

According to a further aspect of one or more of these embodiments, the tool includes a fastener tightening tool that includes a start switch having ON and OFF positions. The output head includes a rotational output head. The resistance sensor includes a torque sensor that measures a torque being applied to the output head. The predetermined shift resistance includes a predetermined shift torque. The method further includes sensing that the start switch is in its ON position. The connecting of the plurality of battery cells to each other and to motor in series occurs in response to the sensing that the start switch is in its ON position. The method further includes, after automatically connecting the plurality of battery cells to each other in parallel and to the motor, automatically disconnecting the motor from the plurality of battery cells in response to the torque sensor sensing that the torque exceeds a predetermined target torque.

According to a further aspect of one or more of these embodiments, the start switch remains in its ON position from when battery cells are connected to each other and to the motor in series until when the motor is disconnected from the plurality of battery cells in response to the torque sensor sensing that the torque exceeds the predetermined target torque. The predetermined target torque may exceed the predetermined shift torque.

According to a further aspect of one or more of these embodiments, the tool includes a start switch having ON and OFF positions. The method further includes sensing that the start switch is in its ON position. The connecting of the plurality of battery cells to each other and to motor in series occurs in response to the sensing that the start switch is in its ON position. The method also includes automatically disconnecting the motor from the plurality of battery cells any time that the start switch moves into its OFF position.

Another aspect of one or more embodiments of the present invention provides a method of using a battery powered tool. The method includes, in response to sensing that a start switch is in its ON position and a resistance of an output head to movement does not exceed a predetermined shift resistance, automatically connecting a plurality of battery cells to each other and a motor in series. The method also includes, in response to sensing that the start switch is in its ON position and the resistance exceeds the predetermined shift resistance, automatically connecting the plurality of battery cells to each other in parallel and to the motor.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EMBODIMENTS OF THE INVENTION

Figure 1:
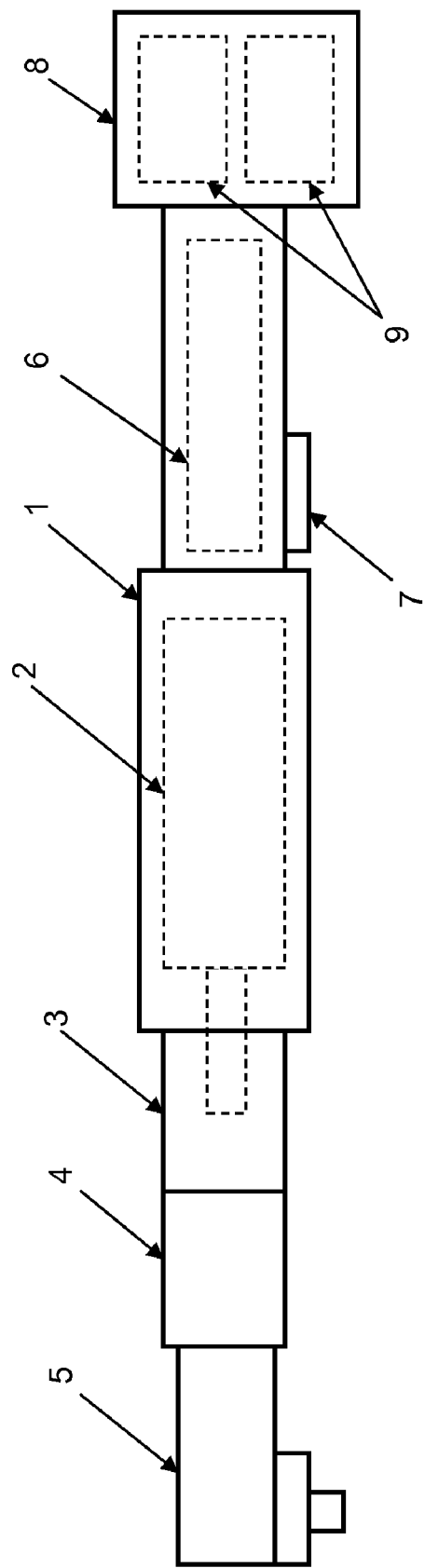
FIG. 1 is a diagrammatic illustration of a battery-powered fastening tool according to an embodiment of the present invention.

FIG. 1 illustrates a battery-powered, hand-held, angle nutsetter 1 according to an embodiment of the present invention. The nutsetter 1 includes a motor 2, an output head 5, a speed reduction gear transmission 3 connecting an output spindle of the motor 2 to the output head 5, a resistance sensor 4 that measures a resistance of the output head 5 to movement (e.g., rotational motion, linear movement), a controller 6, a start switch 7, and a fixed or detachable battery pack or housing 8 capable of including at least two battery cells 9. The housing of the nutsetter 1 defines handles for the operator's hands. The handles provide easy manual access to the start switch 7.

The illustrated motor 2 is a DC motor, which may have either brush-based or brushless commutation means. Alternatively, any other type of suitable motor may be used without deviating from the scope of the present invention.

The transmission 3 has a ratio sufficient to multiply the torque of the motor 2 to a level higher than that required to tighten a fastener to a desirable torque level. In the illustrated embodiment, the transmission 3 has a fixed gear ratio. However, according to an alternative embodiment, the transmission 3 may have a variable gear ratio, the ratio of which may be operator-selected (e.g., high torque/low speed, low torque/high speed, etc.) or automatically varied (e.g., by the controller 6 based on battery power, target torque, sensed torque, etc.). Moreover, depending on the particular application and desired output torque, the transmission 3 may be omitted entirely without deviating from the scope of the present invention.

In one embodiment, the resistance sensor 4 comprises a torque sensor 4 that dynamically measures the torque delivered to the output head 5. It may do so directly if downstream from the transmission 3, or indirectly (e.g., via a conversion ratio) if upstream from the transmission 3. The illustrated torque sensor 4 comprises a strain gauge mounted to the drive train between the transmission 3 and the output head 5. However, the torque sensor 4 may comprise any other type of suitable sensor that measures torque at the output head 5 in any suitable manner (e.g., a torque-sensing transducer, a motor current sensor, an angular rotation sensor, etc.) without deviating from the scope of the present invention.

The illustrated output head 5 is a square drive output spindle for attaching a fastener driving socket. However, the output head 5 may alternatively comprise any other type of suitable output head (e.g., a chuck, a collet, a hex-head, etc.).

The controller 6 may perform one or more of the following functions: monitoring the state of the start switch 7, controlling the operation of the motor 2 (e.g., selectively providing electric power to the motor 2 to start and stop the motor 2, electronically commutating a brushless DC motor), continuously monitoring the torque sensor 4 during a tightening cycle, selectively switching the battery cells 9 between parallel and series arrangements, and stopping the motor 2 when either a pre-selected torque target is reached or when the start switch 7 is released. It should be understood that the controller 6 may also perform many other monitoring and control functions in addition to those described.

The illustrated controller 6 comprises an electronic control unit (ECU) that electronically performs one or more of the above functions. However, according to alternative embodiments, the controller 6 may additionally or alternatively incorporate one or more mechanical components to accomplish its functions. Any type of suitable controller may be used without deviating from the scope of the present invention.

Figure 3B:
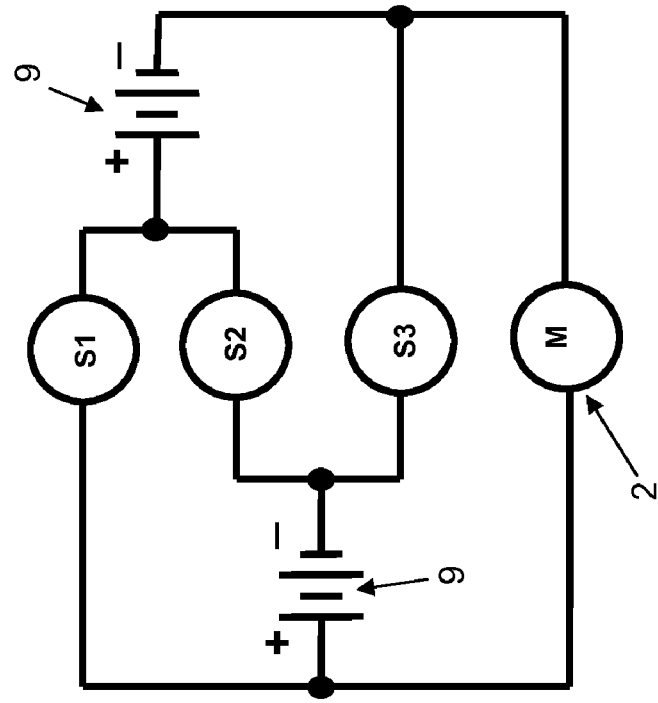
FIG. 3B is a circuit diagram of a battery cell switching system according to an alternative embodiment of the present invention.
Figure 3A:
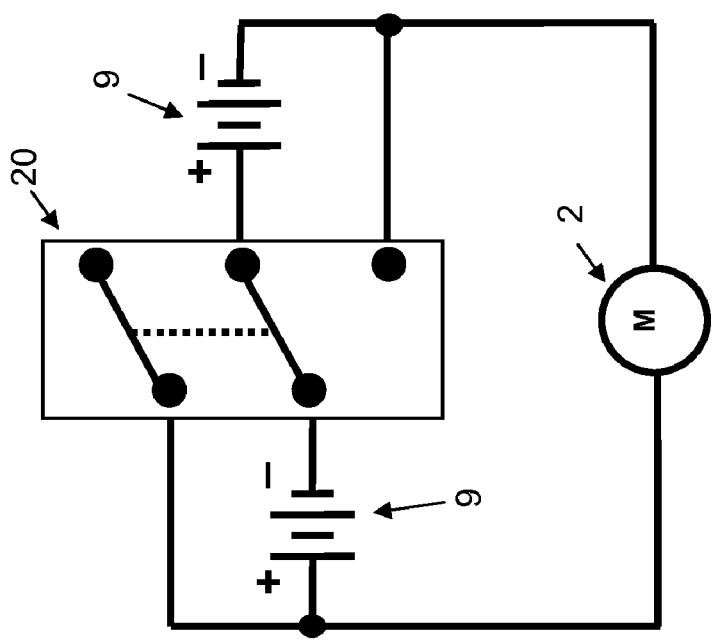
FIG. 3A is a circuit diagram of a battery cell switching system according to an embodiment of the present invention.

FIGS. 3A and 3B show two example methods of enabling the controller 6 to switch the battery cells 9 between parallel and series arrangements. FIG. 3A illustrates the use of a double pole, double throw switch 20. The state of this switch 20 may be electronically or mechanically controlled by the controller 6 using any suitable method. As shown in FIG. 3A, the switch 20 is normally in the series position. Changing the switch 20 to its alternate state places the battery cells 9 into a parallel arrangement. The switch 20 may be a three-position switch that includes an OFF position in which the battery cells 9 are disconnected from the motor 2 and each other. Alternatively, an additional switch (not shown) may be used to disconnect the motor 2 from the battery cells 9.

FIG. 3B illustrates an alternative use of three solid state switches S1, S2, S3 that enable the series/parallel switching function. The controller 6 controls the state of each of these solid state switches S1, S2, S3 as follows: when switch S2 is on and switches S1 and S3 are off, the battery cells 9 connect in series to each other and the motor 2; alternately, when switches S1 and S3 are on, and switch S2 is off, the battery cells 9 connect in a parallel to each other and the motor 2. The switches S1, S2, S3 may be all placed in their off states to turn the motor 2 off. While it is not described in detail herein, similar switching schemes can be enabled for cases where more than two battery cells are used.

While two example parallel/series switching methods are illustrated, any other suitable method of switching between parallel and series arrangements may also be utilized without deviating from the scope of the present invention.

The illustrated start switch 7 comprises an operator-actuated momentary switch having ON and OFF positions, with the start switch 7 being biased toward its OFF position. However, the start switch 7 could alternatively take on a variety of other forms. For example, the start switch 7 could be integrated into the output head 5 such that the start switch is actuated by the engagement of the output head 5 with a fastener.

In the embodiment illustrated in FIGS. 1, 3A, and 3B, each battery cell 9 comprises a single cell. However, according to alternative embodiments, each battery cell 9 may comprise a plurality of battery cells that connect to each other in either a series or a parallel relationship. Similarly, while the illustrated battery pack 8 includes just two battery cells 9, additional battery cells 9 may also be used without deviating from the scope of the present invention. As mentioned above, the parallel/series switching system can be adapted to switch three or more battery cells 9 between parallel and series arrangements.

Hereinafter, operation of the tool 1 is described with reference to FIG. 2, which illustrates a logical flow of operation of the controller 6 according to an embodiment of the present invention. The controller 6 monitors the condition (ON/OFF) of the start switch 7 and begins the tightening cycle when the operator turns the start switch 70N. The controller 6 then places the battery cells 9 in series and connects the series battery cells 9 to the motor 2 to start the motor 2. In the typical case wherein the operator holds the start switch 7 in its ON position, the controller 6 monitors the torque signal from the torque sensor 4 and when the instantaneous torque level exceeds a predetermined shift torque level, the controller 6 switches the battery cells 9 to a parallel arrangement. The tightening cycle continues while the controller 6 continues to monitor the torque signal from the torque sensor 4. When the instantaneous torque level exceeds a predetermined target torque level, the controller 6 stops the motor 2 thereby controlling the maximum torque level applied to the fastener. The operator then releases the start switch 7, which ends the tightening cycle.

Figure 2:
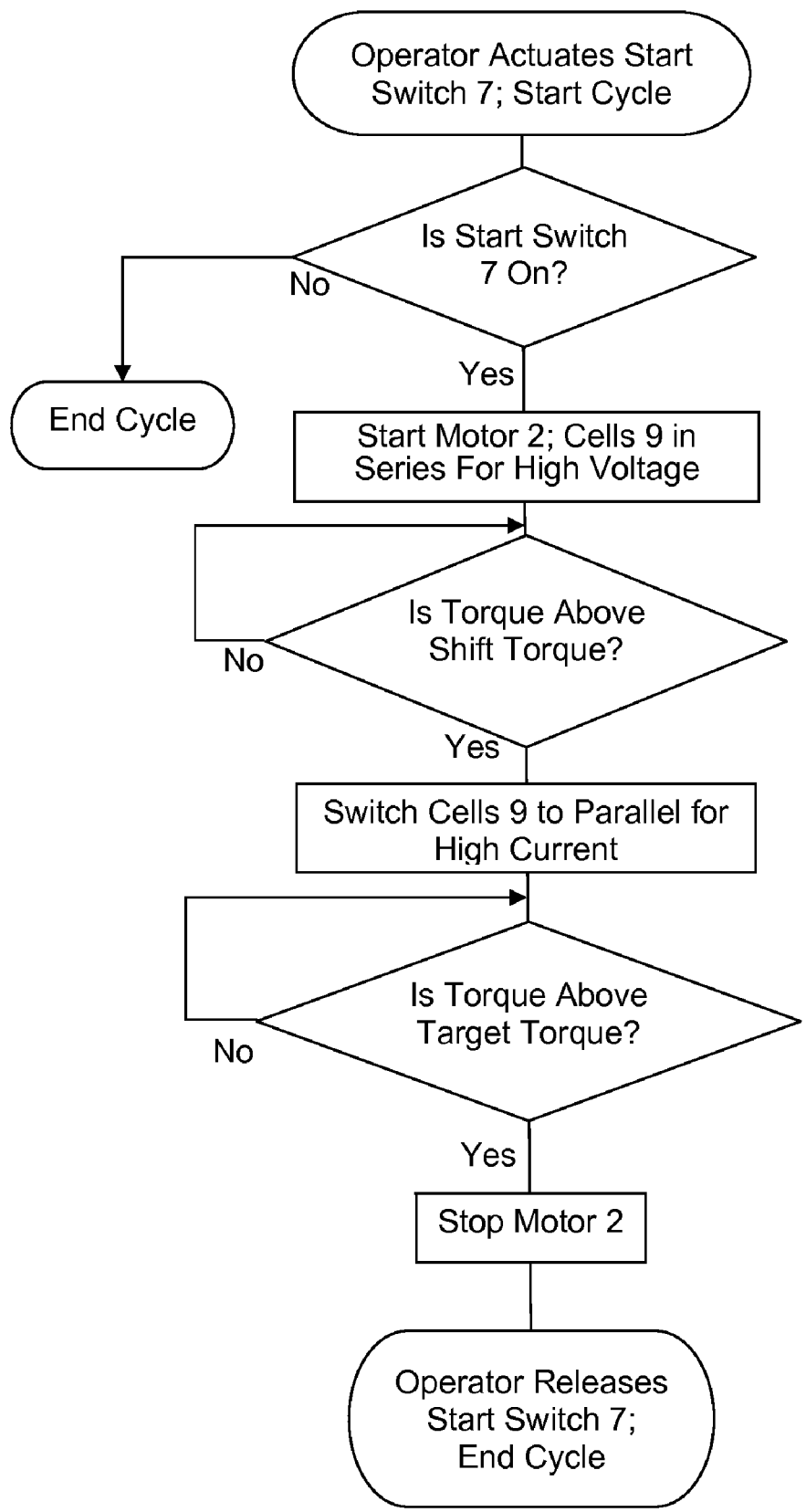
FIG. 2 is a flowchart illustrating a tightening cycle of the tool of FIG. 1.

According to the illustrated embodiment, as shown in FIG. 2, if at any time during the tightening cycle the start switch 7 is released (e.g., moves into its OFF position), the controller 6 stops the motor 2 and aborts the tightening cycle. The entire cycle starts over again when the start switch 7 is again moved into its ON position.

According to the embodiment illustrated in FIG. 2, once the controller 6 switches the battery cells 9 to the parallel arrangement, the controller 6 keeps the battery cells 9 in the parallel arrangement until the operator releases the start switch 7, even if the instantaneous torque level drops below the predetermined shift torque.

According to an alternative control algorithm, the controller 6 continuously monitors the sensed torque while the start switch 7 is in its ON position, and shifts the battery cell 9 arrangement between the series and parallel arrangement based on whether the instantaneous sensed torque exceeds the predetermined shift torque. Consequently, any time the sensed torque is at or below the predetermined shift torque while the start switch 7 is in its ON position, the series battery cell 9 arrangement is used, and anytime the sensed torque exceeds the predetermined shift torque while the start switch 7 is in its ON position, the parallel battery cell 9 arrangement is used. Such continuous monitoring may be useful in operational cycles over which the sensed torque oscillates above and below the predetermined shift torque (e.g., during operational cycles of a reciprocating saw; during an operational cycle of a drill that sequentially drills through materials having different strengths; during tightening of a self-tapping screw). The controller may additionally disconnect the motor 2 from the battery cells 9 when the predetermined target torque is reached.

Instantaneously transitioning from the series arrangement to the parallel arrangement and vice-versa may lead to abrupt speed changes, which could be uncomfortable for the operator. To reduce such abrupt changes, the controller 6 may be designed to gradually shift between the parallel and series arrangements. For example, when switching from the series to the parallel arrangement, the controller 6 may gradually reduce the voltage applied by the series arrangement (e.g. toward or to the maximum voltage of the parallel arrangement) before switching to the parallel arrangement. Conversely, when switching from the parallel arrangement to the series arrangement, the controller 6 may first switch to a reduced voltage series arrangement, and gradually increase the voltage applied by the series-arranged battery cells 9. The controller 6 may be designed to anticipate reaching the predetermined shift torque and begin modifying the voltage ahead of actually reaching the predetermined shift torque. The controller 6 may achieve the gradual voltage shift using any conventional mechanism (e.g., pulse width modulation). The controller 6 may achieve the gradual shift over any suitable time frame (e.g., ½ second, 1 second, 2 seconds), and the time frame may be dependent on the torques/speeds involved in the shift.

Under various conditions, the instantaneously sensed torque may rapidly oscillate above and below the predetermined shift torque. In such circumstances, it may be advantageous to limit how frequently the controller 6 shifts the battery cells 9 between their series and parallel arrangements. Accordingly, the controller 6 may be designed to limit the parallel/series shift frequency in a variety of ways (e.g., a minimum time period between shifts (e.g., ¹⁄₁₀ second, ½ second, 1 second, etc.), a programmable hysteresis function, basing the shift on an average instantaneous torques over a predetermined preceding timeframe).

The controller 6 may include a speed control algorithm that causes the motor 2 to accelerate at a certain rate to a preselected maximum speed during the initial phase of the tightening cycle (i.e., before the predetermined shift torque is reached).

The predetermined shift torque level may be operator-selected, or may be automatically selected by the controller 6 (e.g., as a function of or a fraction of the target torque). The shift torque level is typically selected to be somewhat higher than the torque level required to turn the fastener through its first, relatively free-running phase so that this first part of the tightening phase can be completed with the battery cells 9 in a series connection thereby providing high voltage and allowing a higher maximum speed for this phase of the tightening process. At tightening torque levels above the predetermined shift torque level, the parallel arrangement provides more electrical current to the motor 2, thereby allowing the motor 2 to produce a higher level of torque with less current demand on each of the individual battery cells 9.

The predetermined target torque may be operator-selectable (e.g., via an input (e.g., analog selection dial, digital LCD input, etc.) that operatively connects to the controller 6).

If the transmission 3 is a variable ratio transmission, the controller 6 may also control the transmission 3 in conjunction with controlling the battery cell 9 arrangement. At various sensed torque thresholds, the controller 6 may (1) increase the gear ratio of the transmission 3 to increase the output torque at the output head 5, and/or (2) switch some or all of the battery cells 9 to a parallel arrangement to increase the current and the output torque of the motor 2.

According to another embodiment of the present invention, the battery pack 8 includes four similar battery cells 9, which can individually connect to each other in parallel or series arrangements. For example, under a high voltage state, all four battery cells connect to each other in series (yielding 4 times the voltage of a single battery cell 9). Under an intermediate state, each battery cell 9 connects to one other battery cell 9 in series, and the two sets of series battery cells 9 connect to each other in parallel (yielding twice the voltage and twice the current of a single battery cell 9). Under a high current/parallel state, all four battery cells 9 connect to each other in parallel (yielding four times the current of a single battery cell 9). In such an embodiment, the controller 6 may include tiered predetermined shift torques and sequentially arrange more and more of the battery cells 9 in parallel as the sensed torque increases past each shift torque threshold.

While the illustrated embodiment describes a battery-powered tool for tightening threaded fasteners, one familiar with the art should understand that one or more of the disclosed embodiments may also be used for electrically-powered tools intended for a variety of purposes, such as drilling or sawing. For example, if the battery-powered tool is a saw with a reciprocating output head, the torque sensor 4 may be replaced with another type of resistance sensor, such as a force sensor that senses a force being exerted at the output head (i.e., the output head's resistance to movement). However, in the case of a reciprocating saw that ultimately relies on a rotational motor for power, the force may still be measured via a torque sensor disposed upstream in the drive train from where the rotational motor's rotational output is converted into a reciprocating output. Similarly, in the case of a reciprocating output head, the motor may be a linear motor as opposed to a rotational motor.

Automatically switching between series and parallel battery arrangements may improve the interaction between the battery cells 9 and the motor 2 to provide high speed or high torque when needed. This switching may more efficiently utilize the available power in each battery cell 9, thereby increasing the number of operation cycles that a battery pack 8 can perform between recharges. Additionally, the tool 1 may lower the peak current required from each battery cell 9 during the threaded fastener securing process, thereby extending the number of securing cycles before recharge.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A tool comprising:
an output head;
a motor operatively connected to the output head;
a resistance sensor that measures the output head's resistance to movement; and
a controller connected to the motor and the resistance sensor, the controller being constructed and arranged to connect to a plurality of battery cells,
wherein the controller is constructed and arranged to connect the plurality of battery cells to each other and the motor in series, and subsequently automatically connect the plurality of battery cells to each other in parallel and to the motor when the resistance sensed by the resistance sensor exceeds a predetermined shift resistance.

2. The tool of claim 1, wherein:
the output head comprises a rotational output head;
the resistance sensor comprises a torque sensor that measures a torque applied to the output head;
the predetermined shift resistance comprises a predetermined shift torque.

3. The tool of claim 2, wherein:
the controller is constructed and arranged to disconnect the motor from the plurality of battery cells when the sensed torque exceeds a predetermined target torque, and
the predetermined target torque is larger than the predetermined shift torque.

4. The tool of claim 1, further comprising a fixed ratio transmission disposed between the motor and the output head.

5. The tool of claim 1, wherein the controller comprises an electronic control unit.

6. The tool of claim 1, wherein the resistance sensor comprises a torque sensor.

7. The tool of claim 1, wherein the resistance sensor comprises a force sensor.

8. The tool of claim 1, wherein:
the tool further comprises a start switch having ON and OFF positions, the start switch being operatively connected to the controller; and
the controller is constructed and arranged to connect the plurality of battery cells to each other and to the motor in series in response to the start switch moving into its ON position.

9. The tool of claim 1, wherein:
the tool further comprises a start switch having ON and OFF positions, the start switch being operatively connected to the controller; and
the controller is constructed and arranged such that when the start switch is in its ON position and the resistance sensed by the resistance sensor exceeds the predetermined shift resistance, the controller automatically connects the plurality of battery cells to each other in parallel and to the motor.

10. The tool of claim 1, wherein:
the tool further comprises a start switch having ON and OFF positions, the start switch being operatively connected to the controller; and
the controller is constructed and arranged such that when the start switch is in its ON position and the resistance sensed by the resistance sensor does not exceed the predetermined shift resistance, the controller automatically connects the plurality of battery cells to each other and the motor in series.

11. The tool of claim 1, wherein:
the tool further comprises a start switch having ON and OFF positions, the start switch being operatively connected to the controller;
the controller is constructed and arranged to automatically disconnect the motor from the plurality of battery cells any time that the start switch moves into its OFF position.

12. The tool of claim 1, further comprising a plurality of battery cells connected to the controller.

13. A tool comprising:
an output head;
a motor operatively connected to the output head;
a start switch having ON and OFF positions;
a resistance sensor that measures the output head's resistance to movement; and
a controller connected to the motor, the start switch, and the resistance sensor, the controller being constructed and arranged to connect to a plurality of battery cells,
wherein the controller is constructed and arranged such that when the start switch is in its ON position and the resistance sensed by the resistance sensor does not exceed a predetermined shift resistance, the controller automatically connects the plurality of battery cells to each other and the motor in series, and
the controller is constructed and arranged such that when the start switch is in its ON position and the resistance sensed by the resistance sensor exceeds the predetermined shift resistance, the controller automatically connects the plurality of battery cells to each other in parallel and to the motor.

14. The tool of claim 13, wherein:
the output head comprises a rotational output head;
the resistance sensor comprises a torque sensor that measures a torque applied to the output head;
the predetermined shift resistance comprises a predetermined shift torque.

15. A method of using a battery powered tool, comprising:
(a) connecting a plurality of battery cells to each other and to a motor in series; and
(b) automatically connecting the plurality of battery cells to each other in parallel and to the motor in response to a resistance sensor sensing that a resistance of an output head to movement exceeds a predetermined shift resistance.

16. The method of claim 15, wherein:
the tool comprises a fastener tightening tool that includes a start switch having ON and OFF positions;
the output head comprises a rotational output head;
the resistance sensor comprises a torque sensor that measures a torque being applied to the output head;
the predetermined shift resistance comprises a predetermined shift torque;
the method further comprises:
sensing that the start switch is in its ON position, wherein the connecting of the plurality of battery cells to each other and to motor in series occurs in response to the sensing that the start switch is in its ON position;
after automatically connecting the plurality of battery cells to each other in parallel and to the motor, automatically disconnecting the motor from the plurality of battery cells in response to the torque sensor sensing that the torque exceeds a predetermined target torque.

17. The method of claim 16, wherein:
the start switch remains in its ON position from when battery cells are connected to each other and to the motor in series until when the motor is disconnected from the plurality of battery cells in response to the torque sensor sensing that the torque exceeds the predetermined target torque, and
the predetermined target torque exceeds the predetermined shift torque.

18. The method of claim 15, wherein:
the tool includes a start switch having ON and OFF positions; and
the method further comprises:
sensing that the start switch is in its ON position, wherein the connecting of the plurality of battery cells to each other and to motor in series occurs in response to the sensing that the start switch is in its ON position; and
automatically disconnecting the motor from the plurality of battery cells any time that the start switch moves into its OFF position.

19. A method of using a battery powered tool, comprising:
in response to sensing that a start switch is in its ON position and a resistance of an output head to movement does not exceed a predetermined shift resistance, automatically connecting a plurality of battery cells to each other and a motor in series; and
in response to sensing that the start switch is in its ON position and the resistance exceeds the predetermined shift resistance, automatically connecting the plurality of battery cells to each other in parallel and to the motor.

20. The method of claim 19, wherein:
the tool comprises a fastener tightening tool;
the output head comprises a rotational output head;
sensing the resistance comprises sensing a torque being applied to the output head; and
the predetermined target resistance comprises a predetermined target torque.

* * * * *